(12) United States Patent
Li

(10) Patent No.: US 9,008,711 B2
(45) Date of Patent: Apr. 14, 2015

(54) METHOD, SYSTEM AND TERMINAL FOR STATE TRANSITION

(75) Inventor: Xiaoka Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 311 days.

(21) Appl. No.: 13/120,424

(22) PCT Filed: Sep. 14, 2009

(86) PCT No.: PCT/CN2009/073910
§ 371 (c)(1),
(2), (4) Date: Aug. 12, 2011

(87) PCT Pub. No.: WO2010/028607
PCT Pub. Date: Mar. 18, 2010

(65) Prior Publication Data
US 2011/0287774 A1 Nov. 24, 2011

(30) Foreign Application Priority Data

Sep. 12, 2008 (CN) .......................... 2008 1 0222257

(51) Int. Cl.
| | |
|---|---|
| H04B 7/00 | (2006.01) |
| H04W 4/00 | (2009.01) |
| H04W 72/00 | (2009.01) |
| H04L 12/26 | (2006.01) |
| H04W 76/04 | (2009.01) |
| H04W 72/12 | (2009.01) |

(52) U.S. Cl.
CPC ........ *H04W 76/048* (2013.01); *H04W 72/1289* (2013.01)

(58) Field of Classification Search
USPC .............. 455/450–455, 430, 435.1, 445, 515, 455/418–420, 436, 464, 509; 370/252, 370/328–329, 278, 282, 503, 331, 311, 254, 370/341–342
See application file for complete search history.

(56) References Cited

U.S. PATENT DOCUMENTS

| | | | |
|---|---|---|---|
| 2004/0202329 A1* | 10/2004 | Jung et al. ..................... | 380/273 |
| 2006/0062237 A1* | 3/2006 | Kim .............................. | 370/432 |
| 2007/0147370 A1* | 6/2007 | Hasegawa ..................... | 370/390 |
| 2008/0182594 A1* | 7/2008 | Flore et al. .................... | 455/458 |
| 2009/0124212 A1* | 5/2009 | Islam et al. .................... | 455/70 |
| 2009/0196197 A1* | 8/2009 | DiGirolamo et al. ......... | 370/252 |
| 2009/0196256 A1* | 8/2009 | DiGirolamo et al. ......... | 370/331 |

* cited by examiner

*Primary Examiner* — Michael Mapa
(74) *Attorney, Agent, or Firm* — LaRiviere, Grubman PC

(57) ABSTRACT

The present invention relates to a method, system and UE for state transition. The method includes: after a transition from the CELL-PCH state to the CELL-FACH state, a UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state; after obtaining an indication of normal reception, the UE receives the scheduling control channel according to the receiving time corresponding to the DRX mechanism when the UE is in the CELL-FACH state; the radio network controller has be informed that the UE has transited from the CELL-PCH state to the CELL-FACH state simultaneously when the UE obtains the indication of normal reception, so as to avoid data loss in a certain period after the state transition of the UE.

20 Claims, 4 Drawing Sheets

METHOD, SYSTEM AND TERMINAL FOR STATE TRANSITION

PRIORITY CLAIM

This application claims priority to PCT Patent Application No. PCT/CN2009/073910, entitled Method, System and Terminal for State Transition, filed on Sep. 14, 2009, also claims priority to CN200810222257.6, filed Sep. 12, 2008.

FIELD OF THE INVENTION

The invention relates to a radio network communication technology, in particular to a method, system and UE for state transition.

BACKGROUND OF THE INVENTION

In order to increase a peak rate of data of radio resources in the CELL-FACH state and improve experience of UE, a enhanced CELL-FACH state is proposed in a manner that a High Speed Packet Access (HSPA) enhancement technology is introduced into the CELL-FACH state. Meanwhile, an enhanced CELL-PCH state is proposed in order to reduce delay for state transition between the CELL-FACH state and the CELL-PCH.

The UE, which is in the enhanced CELL-PCH state, monitors the paging indicator carried through the Paging Indicator Channel (PICH) by means of Discontinuous Reception (DRX), and receives information from High Speed Shared Control Channel (HS-SCCH) according to the mapping relationship between the paging indicator and HS-SCCH. If identifier information (e.g., HS-DSCH Radio Network Temporary Identifier (H-RNTI)) for the UE is detected on HS-SCCH, then the UE transits from CELL-PCH state to CELL-FACH state. After the state transition, the state transition information is notified to the radio network controller with a measurement report, and the radio network controller forwards the measurement report to a base station. The base station executes resource scheduling based on the received measurement report forwarded by the radio network controller. Then, the radio network controller maintains and updates the respective UE states according to the state transition information transmitted by the UE.

As the UE, which is provided with DRX mechanism and in the CELL-PCH state and the CELL-FACH state, receives data discontinuously in different DRX periods and the DRX period during which the UE is in the CELL-FACH state is much shorter than the period during which the UE is in the CELL-PCH state. After the state of the UE is transited, the radio network controller will receive the state transition information transmitted by the UE in a certain time period. During this time period, the UE state stored in the radio network controller is different from the actual state of the UE. Thereby the radio network controller would still transmit data to the UE in terms of the DRX period during which the UE is in the CELL-PCH state, whereas data will be lost due to the UE in the CELL-FACH state.

SUMMARY OF THE INVENTION

Owing to the above, the present invention provides a method, a system and a UE for state transition, so as to avoid data loss in a certain period after the state transition of the UE.

The method for state transition includes:
after a transition from the CELL-PCH state to the CELL-FACH state, a UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state; after obtaining an indication of normal reception, the UE receives the scheduling control channel according to the receiving time corresponding to the DRX mechanism when the UE is in the CELL-FACH state; the radio network controller has be informed that the UE has transited from the CELL-PCH state to the CELL-FACH state simultaneously when the UE obtains the indication of normal reception.

A system for state transition includes: a UE and a base station;
wherein the UE is configured for informing the base station that the state transition of the UE has finished after transiting from the CELL-PCH state to the CELL-FACH state, and the UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state; after receiving an indication of normal reception transmitted by the base station, the UE receives the scheduling control channel according to the receiving time corresponding to the DRX mechanism when the UE is in the CELL-FACH state;
the base station is configured for informing the radio network controller of the result of the state transition of UE after being informed that the state transition of the UE has finished, and configured for transmitting the indication of normal reception to the UE.

A system for state transition includes: a UE and a radio network controller;
wherein the UE is configured for informing the radio network controller that the state transition of the UE has finished after transiting from the CELL-PCH state to the CELL-FACH state, and configured for receiving the scheduling control channel continuously, or receiving simultaneously the scheduling control channel according to the receiving time corresponding to the DRX mechanism when the UE is in the CELL-FACH state and the receiving time corresponding to the DRX mechanism when the UE is in the CELL-PCH state; after receiving an indication of normal reception transmitted by the radio network controller, the UE is configured for receiving the scheduling control channel according to the receiving time corresponding to the DRX mechanism when the UE is in the CELL-FACH state; the radio network controller is configured for transmitting the indication of normal reception to the UE after being informed that the state transition of the UE has finished.

A UE includes: a state transition unit, reception processing unit and indication receiving unit; wherein the state transition unit is configured for transmitting a special processing notification to the reception processing unit after the UE transits from the CELL-PCH state to the CELL-FACH state; the reception processing unit is configured for receiving the scheduling control channel continuously, or receiving simultaneously the scheduling control channel according to the receiving time corresponding to the DRX mechanism when the UE is in the CELL-FACH state and the receiving time corresponding to the DRX mechanism when the UE is in the CELL-PCH state after receiving the special processing notification; the reception processing unit is configured for receiving the scheduling control channel according to the receiving time corresponding to the DRX mechanism when the UE is in the CELL-FACH after receiving a normal processing notification; the indication receiving unit is configured for transmitting a normal processing notification to the reception processing unit after receiving an indication of normal reception.

It can be seen from the above technical solutions that in the method, system and UE of the present invention, before the radio network controller is informed that the UE transits from the CELL-PCH state to the CELL-FACH state, the UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state, until it receives an indication of normal reception. That is, after the radio network controller is informed that the transition of the UE has finished, the UE receives the scheduling control channel according to the receiving time corresponding to the DRX mechanism when the UE is in the CELL-FACH state, so as to avoid data loss caused by inconsistency of the UE state stored in the radio network controller with the actual state of the UE in a certain period after the state transition of the UE.

DETAILED DESCRIPTION OF THE PRESENT INVENTION

In order to clarify the object, technical solutions and advantages of the present invention, the present invention will be described in detail in conjunction with figures and embodiments in the following.

The method according to the present invention mainly includes: after transiting from the CELL-PCH state to the CELL-FACH state, a UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state; after obtaining an indication of normal reception, the UE receives the scheduling control channel according to the receiving time corresponding to the DRX mechanism when the UE is in the CELL-FACH state; the radio network controller has be informed that the UE has transited from the CELL-PCH state to the CELL-FACH state simultaneously when the UE obtains the indication of normal reception.

In the present invention, when the radio network controller transmits downlink data to the UE, two channels are mainly used, such as HS-SCCH or Enhanced Absolute Grant Channel (E-AGCH). Therefore, the above scheduling control channel may be HS-SCCH or E-AGCH. For the convenience of description, HS-SCCH is taken as an example in all the following embodiments.

In the above method, the indication of normal reception may be transmitted to the UE either by the base station, or by the radio network controller. Furthermore, the state transition of the UE could be triggered in different ways. Hereafter, several instances of the above method are specified in conjunction with embodiments.

Figure 1:
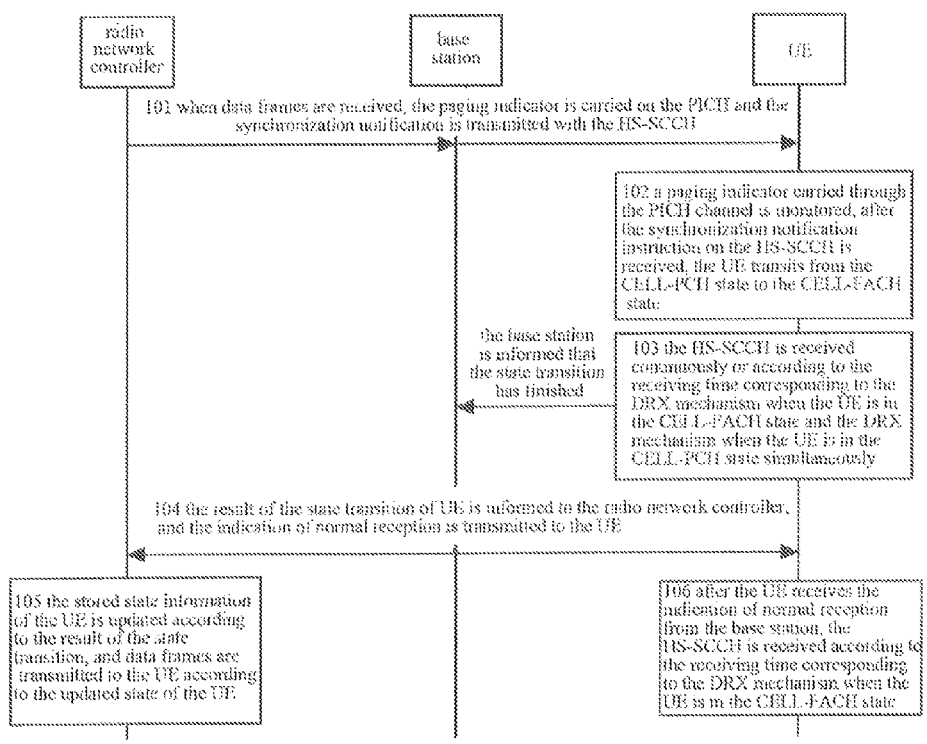
FIG. 1 shows a flow chart of the first method according to embodiments of the present invention.

FIG. 1 is the flow chart of the first method according to the embodiment of the present invention. In this embodiment, after the UE receives the synchronization notification instruction from the base station, a state transition is triggered, and the indication of normal reception is transmitted from the base station to the UE. As shown in FIG. 1, the method may comprise the following steps:

Step 101: when the base station receives data frames which are transmitted from the radio network controller to the UE, the paging indicator is transmitted to the UE with the PICH and the synchronization notification is transmitted with the HS-SCCH to the UE.

The state information of the UE is stored in the radio network controller. When data frames are transmitted to the UE which is in the CELL-PCH state, the data frames carry a type identifier that identifies the UE state and the UE identifier information. For example, the type identifier Type 3 of the data frames identifies that the UE is in the CELL-PCH state. The UE identifier information may be H-RNTI or E-RNTI etc.

After the base station receives the data frames from the radio network controller through Iub interface, the base station may obtain that the UE is in CELL-PCH state from the type identifier carried by the data frames, and thereby a state transition of the UE is required to trigger; or, after the base station receives the data frames from the radio network controller through Iub interface, if the UE is determined to be in CELL-PCH state according to the context information of the UE which is maintained by the base station, then it is required to trigger a state transition of the UE. At this time, paging indicator is carried on the resources corresponding to the UE identified by the H-RNTI in the PICH, and the synchronization notification instruction is transmitted to the UE through the HS-SCCH, wherein this synchronization notification instruction carries the H-RNTI of the UE. The above is the prior art and thereby is not described in detail.

Step 102: when the UE is in CELL-PCH state, a paging indicator carried through the PICH channel is monitored. After receiving the synchronization notification instruction on the HS-SCCH according to the mapping relationship between the paging indicator and the HS-SCCH, the UE transits from the CELL-PCH state to the CELL-FACH state.

Step 103: the UE informs the base station that the state transition of the UE has finished. Furthermore, the UE begins to receive the HS-SCCH continuously, or receive the HS-SCCH according to the receiving time corresponding to the DRX mechanism when the UE is in the CELL-FACH state and the DRX mechanism when the UE is in the CELL-PCH state simultaneously.

In this step, the UE could use the following two manners to inform the base station that the state transition has finished:
(1) after the state transition has finished, the UE initiates an enhanced physical random access to perform an uplink synchronization. The UE transmits E-RUCCH to the base station after the uplink synchronization has finished, upon receiving the E-RUCCH, the base station obtains that the state transition has finished;
(2) after the state transition has finished, the UE could transmit an state transition indicator to the base station through a physical channel. If the base station receives the state transition indication in a preset time period, then it obtains that the state transition has finished. If the base station fails to receive the state transition indication in a preset time period, then it is determined that the state transition of the UE has not finished. The above physical channels for transmitting the state transition indicator may be E-RUCCH, E-PUCH, HS-SICH or PRACH etc. Specifically; the state transition indicator may be carried by Scheduling Information (SI) borne on the E-RUCCH or E-PUCH. For example, Total E-DCH Buffer Status (TEBS) in the SI information is set to zero, and Highest Priority Logical Channel Buffer Status (HLBS) is set to nonzero. Alternatively, the state transition indicator may be carried by Recommended Transport Block Size (RTBS) or Channel Quality Indicator (CQI) borne on the HS-SICH. For example, RTBS or CQI is set to zero so as to identify that the state transition finishes successfully.

In addition, data reception after the state transition of the UE may be performed in tow ways:
(1) the DRX mechanism is stopped and continuous reception initiates, i.e., no DRX timer is started, and HS-SCCH is received continuously,
(2) both the DRX timer when the UE is in the CELL-PCH state and the timer when the UE is in the CELL-FACH are started up so that the HS-SCCH is received according to the receiving time corresponding to the DRX mechanism when the UE is in the CELL-FACH state and the receiving time corresponding to DRX mechanism when the UE is in the CELL-PCH state simultaneously.

Step 104: after the base station is informed that the state transition has finished, the base station informs the radio network controller of the state transition and transmits the indication of normal reception to the UE.

If the base station determines whether the state transition of the UE has finished or not, the base station informs the radio network controller of the state transition by means of Iub interface control plane signalling or HS-DSCH control frame on the user plane, or in the form of data frames. That is, if the base station receives and decodes the indication about accomplishment of the state transition from the UE correctly in a preset time period, then it transmits to the radio network controller an instruction which indicates the state transition of UE has finished successfully. If the base station fails to receive the indication about accomplishment of the state transition from the UE in a preset time period, then it determines that the state transition of the UE has not finished, and the base station transmits to the radio network controller an instruction which indicates the state transition of the UE is failed. The result of the state transition of UE contains the identifier information of the UE.

In addition, in this step, before the result is informed to the radio network controller, the base station may further determine whether the uplink synchronization of the UE has finished or not. If the base station receives the E-RUCCH from the UE, then it determines that the uplink synchronization has finished, and transmits an indication about successful uplink synchronization to the radio network controller so that the radio network controller obtains that the UE has finished the state transition successfully. If the base station fails to receive the E-RUCCH from the UE, then it determines that the uplink synchronization has not finished, and transmits a indication about failed uplink synchronization to the radio network controller so that the radio network controller obtains that the UE fails to finish the state transition. That is, the result of the state transition of UE informed to the radio network controller from the base station may have various forms, such as the indication about successful state transition, the indication about successful uplink synchronization or the indication about failed uplink synchronization.

In this step, the base station transmits the indication of normal reception to UE and the base station informs the radio network controller of the result of the state transition simultaneously. Alternatively, the base station transmits the indication of normal reception to UE after the base station informs the radio network controller of the result of the state transition. The indication of normal reception may be transmitted by the following four ways:
(1) the base station transmits the HS-SCCH scheduling instruction to the UE, and the UE receives the HS-SCCH according to the receiving time corresponding to the DRX mechanism when the UE is in the CELL-FACH state after receiving the HS-SCCH scheduling instruction;
(2) the base station transmits the E-AGCH scheduling instruction to the UE, and the UE receives the HS-SCCH according to the receiving time corresponding to the DRX mechanism when the UE is in the CELL-FACH state after receiving the E-AGCH scheduling instruction. It should be explained that after the UE transits to the CELL-FACH state, E-RUCCH may be transmitted before uplink data are transmitted so as to apply for E-PUCH resources from the base station for transmitting uplink data, the base station grants E-PUCH resources to the UE with the E-AGCH scheduling instruction, and the UE may transmit uplink data with the granted E-PUCH resources. Thereby, it is determined that the base station should obtain that the state transition of the UE has finished, when the UE receives the E-AGCH scheduling instruction.
(3) after the state transition has finished, the UE may transmit uplink data on the granted E-PUCH resources. After the base station has received and decoded the uplink data correctly, the base station will feed back correct decoding indication to the UE through E-HICH. When the UE receives the correct decoding indication, it determines that the base station has obtained that the state transition of the UE has finished;
(4) after the base station is informed that the state transition has finished, it may further transmit feedback information about successful reception to the UE. After the UE receives the feedback information about successful reception, it receives the HS-SCCH according to the receiving time corresponding to the DRX mechanism when the UE is in the CELL-FACH state. If the base station fails to receive the notification indicating the state transition has finished within a preset time period, then it transmits feedback information about failed reception to the UE. If the UE finished the state transition successfully, then it may transmit the notification indicating the state transition has finished again and if the UE fails to finish the state transition, then no processing is performed. The feedback information is transmitted so as to guarantee that the base station successfully receives the notification indicating the state transition has finished from the UE.

It should be explained that whether the base station receives the notification indicating the state transition has finished is determined basing on whether the UE transmits this notification or not and whether the base station decodes this notification successfully.

In addition, the feedback information may be identified in the form of special resources on the HS-SCCH or E-AGCH, or with TBS special value carried on the HS-SCCH.

Step 105: the radio network controller receives the result of the state transition of the UE through Tub interface and updates the stored state information of the UE according to the result. Then, data frames are transmitted to the UE according to the updated UE state.

In this step, after the radio network controller receives the result of the state transition of the UE through Iub interface, if the state transition of the UE has finished successfully, then the state information of the UE stored in the radio network controller is updated to CELL-FACH state. If the state transition of the UE has not finished successfully, then the state information of the UE will not be updated.

In addition, after the radio network controller receives the result of the state transition of the UE, it may transmit feedback information about successful reception to the base station. If the base station fails to receive the feedback information about successful reception in a preset time period, then the base station transmits the result again. Moreover, the base station may transmit an indication of normal reception to the UE after receiving this feedback information.

If SRNC and CRNC are integrated in the radio network controller, then the above step can be executed. If they are arranged separately, then CRNC receives the result of the state transition through Iub interface and then transmits it to SRNC through Iub interface. SRNC updates the stored state information of the UE according to the result.

After updating of the state of the UE, the radio network controller transmits data frames according to the updated UE state, which means that data frames transmitted to the UE hereafter contain type identifier which indicates the updated UE state. After receiving data frames from the radio network controller to the UE, the base station obtains that the UE is in the CELL-FACH state, then the HS-SCCH is transmitted according to the DRX mechanism when the UE is in the CELL-FACH state directly.

Step 106: after the UE receives the indication of normal reception from the base station, the HS-SCCH is received according to the receiving time corresponding to the DRX mechanism when the UE is in the CELL-FACH state.

Thus, the procedure shown in FIG. 1 terminates.

Figure 2:
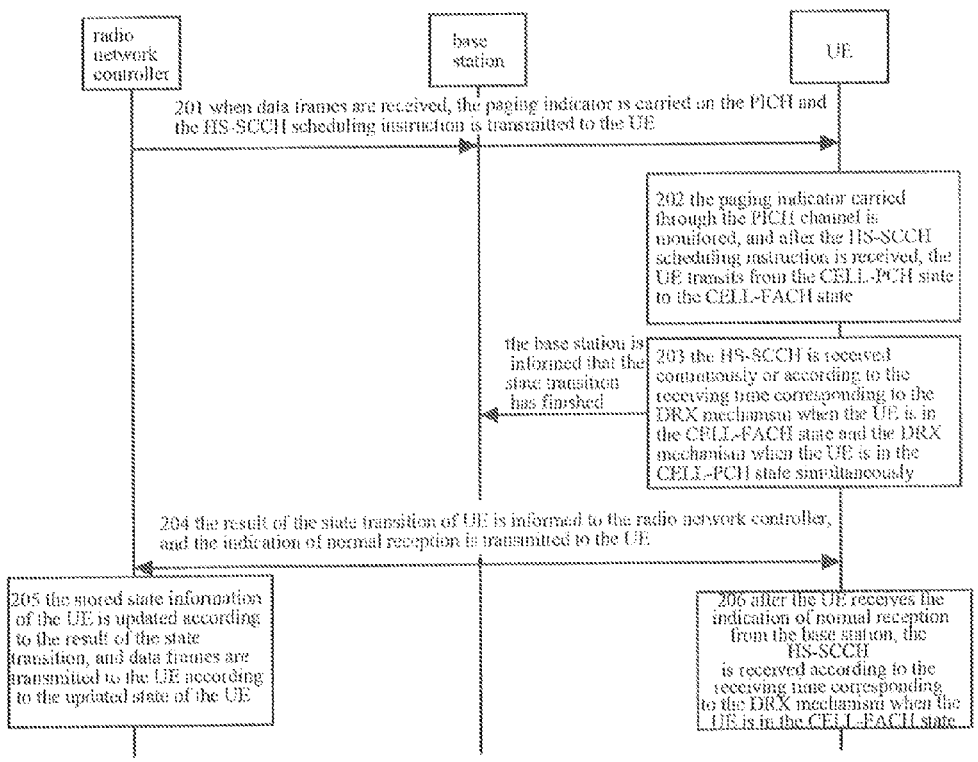
FIG. 2 shows a flow chart of the second method according to embodiments of the present invention.

FIG. 2 shows a flow chart of the second method according to the embodiment of the present invention. In this embodiment, after the UE receives the HS-SCCH scheduling instruction from the base station, a state transition is triggered, and the indication of normal reception is transmitted by the base station. As shown in FIG. 2, the method may comprise the following steps:

Step 201: when the base station receives data frames which are transmitted from the radio network controller to the UE, the paging indicator is transmitted to the UE with the PICH and the HS-SCCH scheduling instruction is transmitted to the UE.

As described in the step 101 in FIG. 1, the state information of the UE is stored in the radio network controller. When data frames are transmitted to the UE which is in the CELL-PCH state, the data frames carry a type identifier that identifies the UE state and the UE identifier information. For example, the type identifier Type 3 of the data frames identifies that the UE is in the CELL-PCH state. The UE identifier information may be H-RNTI or E-RNTI etc.

After the base station receives the data frames from the radio network controller through Iub interface, the base station may obtain that the UE is in CELL-PCH state from the type identifier carried by the data frames, and thereby a state transition of the UE is required to trigger; or, after the base station receives the data frames from the radio network controller through Iub interface, if the UE is determined to be in CELL-PCH state according to the context information of the UE which is maintained by the base station, then it is required to trigger a state transition of the UE. At this time, paging indicator is carried on the resources corresponding to the UE identified by the H-RNTI in the PICH. In addition, the base station may consider that the UE is already in the synchronization state, and no synchronization notification instruction is transmitted to the UE, thus the HS-SCCH scheduling instruction is transmitted to the UE directly according to the DRX mechanism when the UE is in the CELL-PCH state.

Step 202: when the UE is in CELL-PCH state, a paging indicator carried through the PICH channel is monitored. After receiving the HS-SCCH scheduling instruction according to the mapping relationship between the paging indicator and the HS-SCCH, the UE transits from the CELL-PCH state to the CELL-FACH state.

In this embodiment, the state transition of the UE from CELL-PCH state to the CELL-FACH state is triggered by HS-SCCH scheduling instruction. That is, the UE is transited from CELL-PCH state to the CELL-FACH state upon receiving the HS-SCCH scheduling instruction.

Step 203: the UE informs the base station that the state transition has finished. Furthermore, the UE begins to receive the HS-SCCH continuously, or receive the HS-SCCH according to the receiving time corresponding to the DRX mechanism when the UE is in the CELL-FACH state and the DRX mechanism when the UE is in the CELL-PCH state simultaneously.

In this step, the UE could use the following two manners to inform the base station that the state transition has finished:

(1) after the state transition has finished, the UE could transmit an state transition indicator to the base station through a physical channel. If the base station receives the state transition indicator in a preset time period, then it obtains that the state transition has finished. If the base station fails to receive the state transition indicator in a preset time period, then it is determined that the state transition of the UE has not finished. The above physical channels for transmitting the state transition indicator may be E-RUCCH, E-PUCH, HS-SICH or PRACH etc.

(2) after receiving the HS-SCCH scheduling instruction from the base station, the UE will receive data in the HS-PDSCH indicated by the scheduling instruction, and will reply feedback information about a reception acknowledgement to the base station. Therefore, if the base station receives this feedback information about the reception acknowledgement, then it obtains that the state transition has finished.

Similarly, in this step, data reception after the state transition of the UE may be performed in tow ways:

(1) the DRX mechanism is stopped and continuous reception initiates, i.e., no DRX timer is started, and HS-SCCH is received continuously, (2) both the DRX timer when the UE is in the CELL-PCH state and the timer when the UE is in the CELL-FACH are started up so that the HS-SCCH is received according to the receiving time corresponding to the DRX mechanism when the UE is in the CELL-FACH state and the receiving time corresponding to DRX mechanism when the UE is in the CELL-PCH state simultaneously.

Step 204: after the base station is informed that the state transition has finished, the base station informs the radio network controller of the state transition and transmits the indication of normal reception to the UE.

In this step, the base station transmits the indication of normal reception to UE and the base station informs the radio network controller of the result of the state transition simultaneously. Alternatively, the base station transmits the indication of normal reception to UE after the base station informs the radio network controller of the result of the state transition. The indication of normal reception may be transmitted by the following three ways:

(1) the base station transmits the HS-SCCH scheduling instruction to the UE at the Nth time. As the base station may transmit the HS-SCCH scheduling instruction to the UE several times during the state transition of the UE or after the state transition of the UE, the N value may be preset. When the HS-SCCH scheduling instruction transmitted by the base station is received at the Nth time, it means that the base station has already informed the radio network controller of the result of the state transition, and the HS-SCCH can be received according to the receiving time corresponding to the DRX mechanism when the UE is in the CELL-FACH state;

(2) after the base station is informed that the state transition has finished, it may further transmit feedback information about successful reception to the UE. After the UE receives the feedback information about successful reception, it receives the HS-SCCH according to the receiving time corresponding to the DRX mechanism when the UE is in the CELL-FACH state. If the base station fails to receive the notification indicating the state transition has finished within a preset time period, then it transmits feedback information about failed reception to the UE. If the UE finished the state transition successfully, then it may transmit the notification indicating the state transition' has finished again and if the UE fails to finish the state transition, then no processing is performed. The feedback information is transmitted so as to guarantee that the base station successfully receives the notification indicating the state transition has finished from the UE.

The feedback information may be identified in the form of special resources on the HS-SCCH or E-AGCH, or with TBS special value carried on the HS-SCCH.

(3) an indication signalling of normal reception (HS-SCCH order) may be configured for informing the UE that the UE can receive HS-SCCH according to the receiving time corresponding to the DRX mechanism when the UE is in the CELL-FACH state.

Step 205 is the same as the step 105 in FIG. 1.

Step 206 is the same as the step 106 in FIG. 1.

Thus, the process shown in FIG. 2 terminates.

Figure 3:
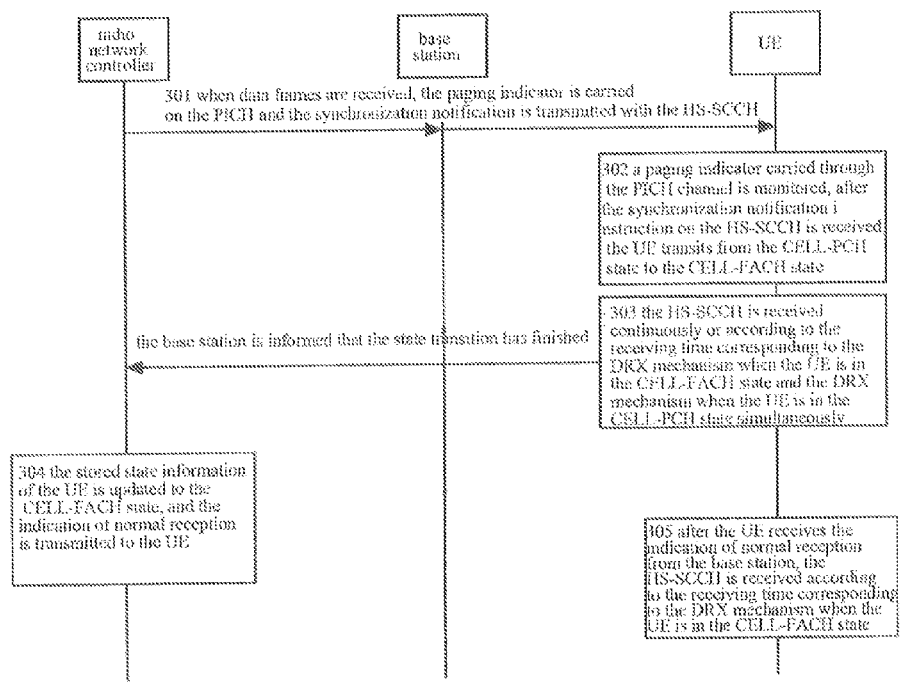
FIG. 3 shows a flow chart of the third method according to embodiments of the present invention.

FIG. 3 shows a flow chart of the third method according to the embodiment of the present invention. In this embodiment, the radio network controller transmits an indication of normal reception, and a state transition may be triggered after the UE receives the synchronization notification instruction from the base station. Alternatively, a state transition may be triggered after the UE receives the HS-SCCH scheduling instruction from the base station. As shown in FIG. 3, the method may comprise the following steps:

Steps 301-302 are the same as steps 101-102 (as shown in FIG. 3) shown in FIG. 1, or steps 201-202 shown in FIG. 2, respectively.

Step 303: the UE informs the radio network controller that the state transition of the UE has finished. Furthermore, the UE begins to receive the HS-SCCH continuously, or receive the HS-SCCH according to the receiving time corresponding to the DRX mechanism when the UE is in the CELL-FACH state and the DRX mechanism when the UE is in the CELL-PCH state simultaneously.

In this step, the UE could inform the radio network controller that the state transition has finished in such a manner that: the UE transmits a measurement report of RRC layer to the radio network controller; after the radio network controller receives this report, it determines that the UE has been transited from the CELL-PCH state to the CELL-FACH state successfully; the radio network controller updates the stored state information of the UE to the CELL-FACH state and forwards the measurement report of RRC layer to the base station; and the base station executes the resource scheduling for the UE according to the received measurement report of RRC layer.

Step 304: after the radio network controller is informed that the state transition has finished, the radio network controller updates the stored state information of the UE to the CELL-FACH state and transmits the indication of normal reception to the UE.

The radio network controller may confirm that the frames carry the indication of normal reception according to the RRC layer signalling information transmitted to the UE or through the RLC layer, wherein the RRC layer signalling information may be the cell updating confirmation information, radio bearer reconfiguration information and so on.

Step 305: after the UE receives the indication of normal reception from the radio network controller, the HS-SCCH is received according to the receiving time corresponding to the DRX mechanism when the UE is in the CELL-FACH state. Thus, the process shown in FIG. 3 terminates.

Besides that in FIGS. 1-3 the base station transmits the synchronization notification instruction and HS-SCCH scheduling instruction to the UE through HS-SCCH to trigger a state transition of the UE, the UE can also trigger the state transition by itself. That is, when the UE is in the CELL-PCH state and there are uplink data to be transmitted, it is possible to automatically trigger a state transition from the CELL-PCH state to the CELL-FACH state, and the following procedures may be the same as those shown in FIGS. 1-3 and will be ignored here.

In the procedure of the above respective embodiments, the following operations may be similar with the prior art: after updating the state information of the UE, the radio network controller transmits data frames carrying the type identifier to the UE, the type identifier identifies that the UE is in the CELL-FACH state; after the base station receives the data frames, it can determine that the UE is in CELL-FACH state according to the type identifier or the context of the maintained UE, then the HS-SCCH carrying the data frames is transmitted to the UE according to the DRX mechanism when the UE is in the CELL-FACH state.

Figure 4:
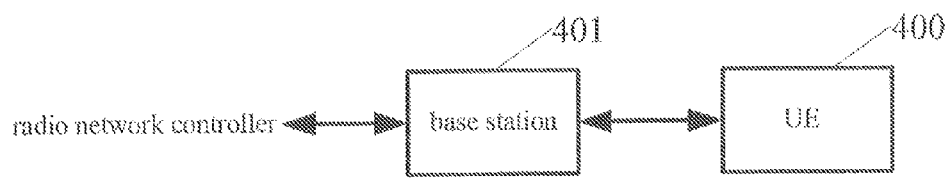
FIG. 4 shows a block diagram of the first system according to embodiments of the present invention.

The above description involves the method of the present invention, hereafter the description will focus on the system and the UE according to the present invention. It can be seen from the above method that both the base station and the radio network controller receives reports that the state transition has finished from the UE and transmit a indication of normal reception. Therefore, the system of the present invention may have two structures. FIG. 4 shows a block diagram of the first system according to the embodiment of the present invention. As shown in FIG. 4, the system may comprise: a UE 400 and a base station 401.

The UE 400 is configured for informing the base station that the state transition of the UE has finished after transiting from the CELL-PCH state to the CELL-FACH state, and the UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state; after receiving an indication of normal reception transmitted by the base station, the UE 400 receives the scheduling control channel according to the receiving time corresponding to the DRX mechanism when the UE is in the CELL-FACH state.

The scheduling control channel comprises: HS-SCCH or E-AGCH.

The base station 401 is configured for informing the radio network controller of the result of the state transition of UE after being informed that the state transition of the UE has finished, and configured for transmitting the indication of normal reception to the UE.

According to three manners for triggering the state transition of the UE 400, the base station 401 and the UE 400 may function as the following instances:

(1) the base station 401 may also receive the data frames transmitted to the UE from the radio network controller. If the type identifier carried by the data frames indicates that the UE is in CELL-PCH state, or it determines that the UE 400 is in the CELL-PCH state according to the context information of the UE 400 which is maintained by the base station 401, then the base station 401 transmits a synchronization notification instruction with the HS-SCCH to the UE 400.

After receiving the synchronization notification instruction, the UE 400 is transited from the CELL-PCH state to the CELL-FACH state.

(2) the base station 401 may also receive the data frames transmitted to the UE 400 from the radio network controller. If the type identifier carried by the data frames indicates that the UE is in CELL-PCH state, or it determines that the UE 400 is in the CELL-PCH state according to the context information of the UE 400 which is maintained by the base station 401, then the base station 401 transmits a HS-SCCH scheduling instruction to the UE 400 according to the DRX mechanism when the UE is in the CELL-PCH state.

After receiving the HS-SCCH scheduling instruction, the UE 400 transits from the CELL-PCH state to the CELL-FACH state.

(3) when the UE 400 is in the CELL-PCH state and should transmit uplink data, the UE 400 transits from the CELL-PCH state to the CELL-FACH state.

Under the first and the third instances, the UE 400 further initiates an enhanced physical random access after receiving the synchronization notification instruction, and transmits E-RUCCH to the base station 401 after the uplink synchronization has finished to inform the base station 401 that the state transition of the UE 400 has finished. Alternatively, the UE 400 transmits a state transition indication to the base station through physical channels to inform the base station that the state transition of the UE has finished.

The indication of normal reception transmitted by the base station 401 may be HS-SCCH scheduling instruction, E-AGCH scheduling instruction, the indication of correct decoding which is fed back to the UE 400 from the base station back through E-HICH, or the feedback information about successful reception which is replied from the base station after the base station 401 obtains that the state transition of the UE 400 has finished.

Under the second and the third instances, the UE 400 may transmit a state transition indication to the base station 401 through physical channels to inform the base station that the state transition of the UE has finished. Alternatively, when data are received on the HS-PDSCH resources indicated by the HS-SCCH scheduling instruction, the UE 400 transmits the feedback information of data reception acknowledgement to the base station to inform the base station that the state transition of the UE has finished.

The base station 401 transmits the HS-SCCH scheduling instruction transmitted to the UE 400 at the Nth time, the feedback information of successful reception replied from the base station after the base station 401 obtains the state transition of the UE 400 has finished, or an additional indication of normal reception configured as the indication of normal reception to the UE 400, wherein N is a preset value.

Figure 5:
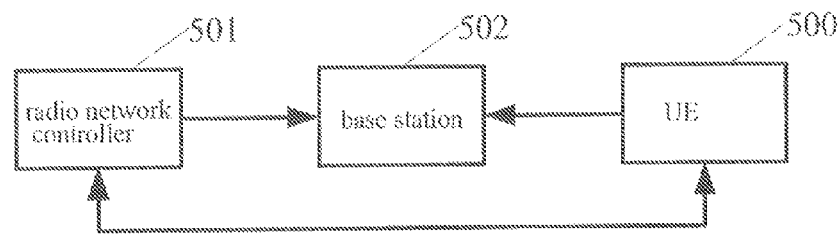
FIG. 5 shows a block diagram of the second system according to embodiments of the present invention.

FIG. 5 shows a block diagram of the second system according to the embodiment of the present invention. As shown in FIG. 5, the system may comprise: a UE 500 and a radio network controller 501.

The UE 500 is configured for informing the radio network controller 501 that the state transition of the UE 500 has finished after transiting from the CELL-PCH state to the CELL-FACH state, and configured for receiving the scheduling control channel continuously, or receiving simultaneously the scheduling control channel according to the receiving time corresponding to the DRX mechanism when the UE is in the CELL-FACH state and the receiving time corresponding to the DRX mechanism when the UE is in the CELL-PCH state; after receiving an indication of normal reception transmitted by the radio network controller 501, the UE 500 is configured for receiving the scheduling control channel according to the receiving time corresponding to the DRX mechanism when the UE is in the CELL-FACH state.

The radio network controller 501 is configured for transmitting the indication of normal reception to the UE 500 after being informed that the state transition of the UE 500 has finished.

The system may further comprise: a base station 502, which is configured for receiving the data frames transmitted to the UE from the radio network controller 501. If the type identifier carried by the data frames indicates that the UE is in CELL-PCH state, or it determines that the UE 500 is in the CELL-PCH state according to the context information of the UE 500 which is maintained by the base station 502, then the base station 501 transmits a synchronization notification instruction with the HS-SCCH to the UE 500, or transmits a HS-SCCH scheduling instruction according to the DRX mechanism when the UE is in the CELL-PCH state to the UE 500.

After receiving the synchronization notification instruction or the HS-SCCH scheduling instruction, the UE 500 transits from the CELL-PCH state to the CELL-FACH state.

In addition, when the UE 500 is in the CELL-PCH state and should transmit uplink data, the UE 500 transits from the CELL-PCH state to the CELL-FACH state.

In this system, the UE 500 could inform the radio network controller 501 that the state transition has finished by transmitting a measurement report of RRC layer.

The indication of normal reception transmitted by the radio network controller may be RRC layer signalling information or RRC layer acknowledgement frames.

Figure 6:
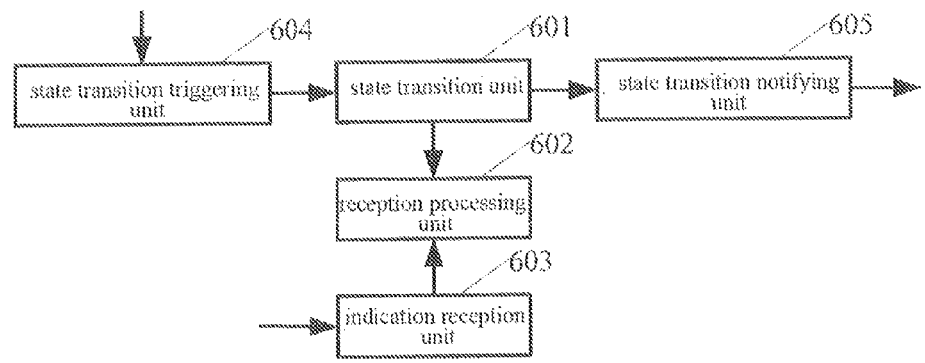
FIG. 6 shows a block diagram of the UE according to embodiments of the present invention.

FIG. 6 shows a block diagram of the UE according to the embodiments of the present invention. As shown in FIG. 6, the UE may include: a state transition unit 601, a reception processing unit 602 and an indication reception unit 603.

The state transition unit 601 is configured for transmitting a special processing notification to the reception processing unit 602 after the UE transits from the CELL-PCH state to the CELL-FACH state.

The reception processing unit 602 is configured for receiving the scheduling control channel continuously, or receiving simultaneously the scheduling control channel according to the receiving time corresponding to the DRX mechanism when the UE is in the CELL-FACH state and the receiving time corresponding to the DRX mechanism when the UE is in the CELL-PCH state after receiving the special processing notification; the reception processing unit is configured for receiving the scheduling control channel according to the receiving time corresponding to the DRX mechanism when the UE is in the CELL-FACH after receiving a normal processing notification; The indication receiving unit 603 is configured for transmitting a normal processing notification to the reception processing unit 602 after receiving an indication of normal reception.

In addition, the UE may also include: a state transition triggering unit 604 and a state transition notifying unit 605.

The state transition triggering unit 604 is configured for triggering the state transition unit 601 to transit the UE from the CELL-PCH state to the CELL-FACH state after receiving the synchronization notification instruction or HS-SCCH scheduling instruction transmitted by the base station, or the state transition triggering unit 604 is configured for triggering the state transition unit 601 to transit the UE from the CELL-PCH state to the CELL-FACH state when the UE is in the CELL-PCH state and should transmit uplink data.

The state transition notifying unit 605 is configured for informing the base station or the radio network controller that the transition of the UE has finished after the state transition unit 601 has finished the state transition.

If the state transition triggering unit 604 triggers the state transition unit 601 to transit the UE from the CELL-PCH state to the CELL-FACH state after receiving the synchronization notification instruction, or if the state transition triggering unit 604 is configured for triggering the state transition unit 601 to transit the UE from the CELL-PCH state to the CELL-FACH state when the UE is in the CELL-PCH state and should transmit uplink data, then the state transition notifying unit 605 transmits E-RUCCH to the base station after the UE has finished the uplink synchronization so as to inform the base station that the transition of the UE has finished, or the state transition notifying unit 605 transmits a state transition indication to the base station through physical channels to inform the base station that the transition of the UE has finished.

The indication of normal reception received by the indication reception unit 603 may be HS-SCCH scheduling instruction, E-AGCH scheduling instruction, the indication of correct decoding which is fed back to the UE from the base station back through E-HICH, or the feedback information about successful reception which is replied from the base station after the base station obtains that the state transition of the UE has finished.

If the state transition triggering unit 604 triggers the state transition unit 601 to transit the UE from the CELL-PCH state to the CELL-FACH state after receiving the HS-SCCH scheduling instruction, or if the state transition triggering unit 604 is configured for triggering the state transition unit 601 to transit the UE from the CELL-PCH state to the CELL-FACH state when the UE is in the CELL-PCH state and should transmit uplink data, then the state transition notifying unit 605 transmits a state transition indication to the base station through physical channels to inform the base station that the state transition of the UE has finished. Alternatively, when data are received on the HS-PDSCH resources indicated by the HS-SCCH scheduling instruction, the UE transmits the feedback information about data reception acknowledgement to the base station to inform the base station that the state transition of the UE has finished.

Here, the indication of normal reception received by the indication reception unit 603 includes: the HS-SCCH scheduling instruction transmitted to the UE at the Nth time, the feedback information of successful reception replied from the base station after the base station obtains the state transition of the UE has finished, or an additional indication of normal reception, wherein N is a preset value.

When the UE directly reports to the radio network controller that the state transition of the UE has finished, the state transition notifying unit 605 could transmit a measurement report of the RRC layer to the radio network controller so as to inform the radio network controller that the state transition has finished.

The indication reception unit 603 is configured for obtaining the indication of normal reception by means of the received RRC layer signalling information or RLC layer acknowledgement frames.

It can be seen from the above technical solutions that in the method, system and UE of the present invention, before the radio network controller is informed that the UE transits from the CELL-PCH state to the CELL-FACH state, the UE receives the scheduling control channel continuously, or receives simultaneously the scheduling control channel according to the receiving time corresponding to the DRX mechanism when the UE is in the CELL-FACH state and the receiving time corresponding to the DRX mechanism when the UE is in the CELL-PCH state, until it receives an indication of normal reception. That is, after the radio network controller is informed that the transition of the UE has finished, the UE receives the scheduling control channel according to the receiving time corresponding to the DRX mechanism when the UE is in the CELL-FACH state, so as to avoid data loss caused by inconsistency of the UE state stored in the radio network controller with the actual state of the UE in a certain period after the state transition of the UE.

Furthermore, the method, system and UE according to the present invention are adapted for not only the FDD system, but also the TDD system. In particular, in the TDD system, the embodiments of the present invention describe that the UE informs the base station that the state transition of the UE has finished after the UE has finished the state transition and then the base station reports it to the radio network controller, or the UE directly informs the radio network controller that the state transition of the UE has finished after the UE has finished the state transition, so as to solve the problem that it is impossible for the radio network controller to obtain the information about the state transition of the UE from the CELL-PCH state to the CELL-FACH state in the TDD system.

The above description is only preferred embodiments of the present invention and should not be construed as limiting to the present invention. Any modifications, equivalent replacements, improvements made without departing from the principle and spirit of the present invention should fall within the scope of protection of the present invention.

What is claimed is:

1. A method for state transition in a handheld mobile communications device (UE), the method comprising the steps of:
   receiving a scheduling control channel according to a receiving time corresponding to a Discontinuous Reception (DRX) mechanism after the UE is in a CELL-FACH state simultaneously with a receiving time corresponding to the DRX mechanism when the UE is in a CELL-PCH state;
   after obtaining an indication of normal reception, receiving the scheduling control channel only according to the receiving time corresponding the DRX mechanism when the UE is in the CELL-FACH state;
   whereby a radio network controller has been informed that the UE has transitioned from the CELL-PCH state to the CELL-FACH state simultaneously when the UE obtains the indication of normal reception.

2. The method according to claim 1, wherein, the scheduling control channel comprises: a High Speed Shared Control Channel (HS-SCCH) and an Enhanced Absolute Grant Channel (E-AGCH).

3. The method according to claim 2, wherein, before the UE has transited from the CELL-PCH state to the CELL-FACH state, further including the steps of: transmitting data frames from a base station to the UE from the radio network controller, identifying a type identifier carried by the data frames that the UE is in CELL-PCH state or determining that the UE is in the CELL-PCH state according to context information of the UE which is maintained by the base station, then the base station transmitting a synchronization notification instruction with the High Speed Shared Control Channel (HS-SCCH) from the base station to the UE to trigger the state transition of the UE;
   after the state transition of the UE, the method further includes the steps of: the UE informing the base station that the state transition of the UE has finished, the base station informing the radio network controller of the result of the state transition after the state transition of the UE has finished and transmitting the indication of normal reception to the UE; or, the UE informing the radio network controller that the state transition of the UE has finished, the radio network controller transmitting the indication of normal reception to the UE after the state transition of the UE has finished, or
   before the UE has transited from the CELL-PCH state to the CELL-FACH state, the method further includes the steps of: when the base station receives the data frames transmitted to the UE from the radio network controller, if the type identifier carried by the data frames indicates that the UE is in CELL-PCH state, or, it determines that the UE is in the CELL-PCH state according to the context information of the UE which is maintained by the base station, then transmitting the HS-SCCH scheduling instruction to the UE according to the DRX mechanism when the UE is in the cell-PCH state to trigger the state transition of the UE;
   after the state transition of the UE, the method further includes the steps of: the UE informing the base station that the state transition of the UE has finished, the base station informing the radio network controller of the result of the state transition after obtaining the state transition of the UE has finished and transmitting the indication of normal reception to the UE; or, the UE informing the radio network controller that the state transition of the UE has finished, the radio network controller transmitting the indication of normal reception to the UE after obtaining the state transition of the UE has finished, or
   before the UE has transited from the CELL-PCH state to the CELL-FACH, the method further includes the steps of: when the UE is in CELL-PCH state and transmits uplink data, triggering the state transition from the CELL-PCH state to the CELL-FACH state;
   after the state transition of the UE, the method further includes the steps of: the UE informing the base station that the state transition of the UE has finished, the base station informing the radio network controller of the result of the state transition after the state transition of the UE has finished and transmitting the indication of normal reception to the UE; or, the UE informing the radio network controller that the state transition of the UE has finished, the radio network controller transmitting the indication of normal reception to the UE after obtaining the state transition of the UE has finished.

4. The method according to claim 3, wherein, the step of the UE informing the base station that the state transition of the UE has finished further includes the steps of: after the state transition of the LIE, the UE initiating an enhanced physical random access to perform an uplink synchronization and transmitting E-RUCCH after the uplink synchronization has finished to inform the base station that the state transition has finished; or, after the state transition of the UE, the UE transmitting a state transition indication to the base station through a physical channel to inform the base station that the state transition has finished;
   the indication of normal reception transmitted by the base station comprises: a HS-SCCH scheduling instruction, an Enhanced Absolute Grant Channel (E-AGCH) scheduling instruction, the indication of correct decoding which is fed back to the UE from the base station back through E-HICH, or feedback information about successful reception which is replied from the base station after the base station obtains that the state transition of the UE has finished.

5. The method according to claim 3, wherein, the step of the UE informing the base station that the state transition of the UE has finished further includes the steps of: after the state transition of the UE, the UE transmitting a state transition indication to the base station through a physical channel to inform the base station that the state transition has finished; or, after the state transition of the UE, when data are received on HS-PDSCH resources indicated by the HS-SCCH scheduling instruction, transmitting feedback information about data reception acknowledgement to the base station to inform the base station that the state transition of the UE has finished, and
   the indication of normal reception transmitted by the base station comprises: the HS-SCCH scheduling instruction transmitted to the UE at a time N, the feedback information of successful reception replied from the base station after the base station obtains the state transition of the UE has finished, or an additional indication of normal reception, wherein N is a preset value greater than or equal to 0 microseconds.

6. The method according to claim 3, wherein, the method further comprises: if the base station fails to receive an indication that the state transition of the UE has finished in a preset time period, then transmitting the result of the failed state transition to the radio network controller, and
   if the radio network controller fails to receive the result of the state transition transmitted by the base station in a preset time period or decoding fails, then the radio network controller replying acknowledgement information of the failed reception to the base station, otherwise replying the acknowledgement information of the successful reception to the base station.

7. The method according to claim 3, wherein, the step of the UE informing the radio network controller that the state transition of the UE has finished further includes the steps of: after the state transition of the UE, the UE transmitting a measurement report of radio resource control (RRC) layer to the radio network controller to inform the radio network controller that the state transition of the UE has finished;
   the radio network controller carrying the indication of normal reception within the RRC layer signalling information transmitted to the UE or RLC layer acknowledgement frames.

8. A system for state transition, wherein, the system includes: a UE and a base station;
   the UE, configured for informing the base station that a state transition of the UE has finished after transiting from a CELL-PCH state to a CELL-FACH state, and configured for receiving a scheduling control channel according to a receiving time corresponding to a Discontinuous Reception (DRX) mechanism after the UE is in the CELL-FACH simultaneously with a receiving time corresponding to the DRX mechanism when the UE is in the CELL-PCH state; after receiving an indication of normal reception transmitted by the base station, the UE receiving the scheduling control channel according to the receiving time corresponding to the DRX mechanism when the UE is in the CELL-FACH state and the base station, configured for informing a radio network controller of the result of the state transition of UE after being informed that the state transition of the UE has finished, and configured for transmitting the indication of normal reception to the UE.

9. The system according to claim 8, wherein, the base station is also configured for transmitting a synchronization notification instruction with a High Speed Shared Control Channel (HS-SCCH) to the UE, if a type identifier carried by data frames indicates that the UE is in CELL-PCH state, or it determines that the UE is in the CELL-PCH state according to context information of the UE which is maintained by the base station, when the base station receives the data frames transmitted to the UE from the radio network controller and the UE transits from the CELL-PCH state to the CELL-FACH state, after the UE receives the synchronization notification instruction, or wherein, the base station is also configured for transmitting the HS-SCCH scheduling instruction to the UE according to the DRX mechanism when the UE is in the CELL-PCH state if the type identifier carried by the data frames indicates that the UE is in CELL-PCH state, or it determines that the UE is in the CELL-PCH state according to the context information of the UE which is maintained by the base station, when the base station receives the data frames transmitted to the UE from the radio network controller;

the UE transits from the CELL-PCH state to the CELL-FACH state, after the UE receives the HS-SCCH scheduling instruction, or wherein, when the UE is in CELL-PCH state and will transmit uplink data, the UE transits from the CELL-PCH state to the CELL-FACH state.

10. The system according to claim 9, wherein, after the UE has transited from the CELL-PCH state to the CELL-FACH state, the UE initiates an enhanced physical random access to perform an uplink synchronization and transmits E-RUCCH after the uplink synchronization has finished to inform the base station that the state transition has finished; or, after receiving the synchronization notification instruction, the UE transits from the CELL-PCH state to the CELL-FACH state, and transmits a state transition indication to the base station through a physical channel to inform the base station that the state transition has finished; and the base station transmits the indication of normal reception to the UE, wherein the indication of normal reception comprises: a HS-SCCH scheduling instruction, an Enhanced Absolute Grant Channel (E-AGCH) scheduling instruction, the indication of correct decoding which is fed back to the UE from the base station back through E-HICH, or feedback information about successful reception which is replied from the base station after the base station obtains that the state transition of the UE has finished.

11. The system according to claim 9, wherein, after the UE has transited from the CELL-PCH state to the CELL-FACH state, the UE transmits a state transition indication to the base station through a physical channel to inform the base station that the state transition has finished; or, after the UE has transited from the CELL-PCH state to the CELL-FACH state, when data are received on the HS-PDSCH resources indicated by the HS-SCCH scheduling instruction, the UE transmits feedback information about data reception acknowledgement to the base station to inform the base station that the state transition of the UE has finished; and the base station transmits the indication of normal reception to the UE, wherein the indication of normal reception comprises: the HS-SCCH scheduling instruction transmitted to the UE at a time N, the feedback information of successful reception replied from the base station after the base station obtains the state transition of the UE has finished, or an additional indication of normal reception, and N is a preset value greater than or equal to 0 microseconds.

12. A system for state transition, wherein, the system includes: a UE and a radio network controller;

the UE, configured for informing the radio network controller that a state transition of the UE has finished after transiting from a CELL-PCH state to a CELL-FACH state, and configured for receiving a scheduling control channel according to a receiving time corresponding to a Discontinuous Reception (DRX) mechanism after the UE is in the CELL-FACH state simultaneously with a receiving time corresponding to the DRX mechanism when the UE is in the CELL-PCH state; after receiving an indication of normal reception transmitted by the radio network controller, the UE being configured for receiving the scheduling control channel according to the receiving time corresponding to the DRX mechanism when the UE is in the CELL-FACH state; and the radio network controller, configured for transmitting the indication of normal reception to the UE after being informed that the state transition of the UE has finished.

13. The system according to claim 12, wherein, the system further includes: a base station, configured for transmitting a synchronization notification instruction with a High Speed Shared Control Channel (HS-SCCH) to the UE or transmitting the HS-SCCH scheduling instruction to the UE according to the DRX mechanism when the UE is in the CELL-PCH state, if the type identifier carried by data frames indicates that the UE is in CELL-PCH state, or it determines that the UE is in the CELL-PCH state according to context information of the UE which is maintained by the base station, when the base station receives the data frames transmitted to the UE from the radio network controller;

the UE transits from the CELL-PCH state to the CELL-FACH state, after the UE receives the synchronization notification instruction or the IS-SCCH scheduling instruction.

14. The system according to claim 12, wherein, when the UE is in CELL-PCH state and will transmit uplink data, the UE transits from the CELL-PCH state to the CELL-FACH state.

15. The system according to claim 12, wherein, the UE transmits a measurement report of RRC layer to the radio network controller to inform the radio network controller that the state transition of the UE has finished; and the radio network controller carries the indication of normal reception within an RRC layer signalling information transmitted to the UE or an RLC layer acknowledgement frames.

16. A UE, having: a state transition device, a reception processor and an indication reception device:

the state transition device, configured for transmitting a special processing notification to the reception processor after the UE transits from a CELL-PCH state to a CELL-FACH state;

the reception processor, configured for receiving a scheduling control channel according to a receiving time corresponding to a Discontinuous Reception (DRX) mechanism after the UE is in the CELL-FACH state simultaneously with a receiving time corresponding to the DRX mechanism when the UE is in the CELL-PCH state;

after receiving the special processing notification, the reception processor configured for receiving the scheduling control channel according to the receiving time corresponding to the DRX mechanism when the UE is in the CELL-FACH state after receiving a normal processing notification;

the indication reception device, configured for transmitting a normal processing notification to the reception processor after receiving an indication of normal reception.

17. The UE further includes: a state transition triggering device and a state transition notifying device:

the state transition triggering device configured for triggering the state transition device to transit the UE from the CELL-PCH state to the CELL-FCH state after receiving a synchronization notification instruction or a High Speed Shared Control Channel (HS-SCCH) scheduling instruction transmitted by a base station, or configured for triggering the state transition device to transit the UE from the CELL-PCH state to the CELL-FACH state when the UE is in the CELL-PCH state and should transmit uplink data; and the state transition notifying device configured for informing a base station or the radio network controller that the transition of the UE has finished after the state transition device has finished transition.

18. The UE according to the claim 17, wherein, if the state transition triggering device triggers the state transition device to transit the UE from the CELL-PCH state to the CELL-FACH state after receiving the synchronization notification instruction, or if the state transition triggering device is configured for triggering the state transition device to transit the UE from the CELL-PCH state to the CELL-FACH state when the UE is in the CELL-PCH state and should transmit uplink data;

then the state transition notifying device transmits E-RUCCH to the base station after the UE has finished the uplink synchronization so as to inform the base station that the transition of the UE has finished, or the state transition notifying device transmits a state transition indication to the base station through physical channels to inform the base station that the transition of the UE has finished; and the indication of normal reception received by the indication reception device may be a High Speed Shared Control Channel (HS-SCCH) scheduling instruction, an Enhanced Absolute Grant Channel (E-AGCH) scheduling instruction, an indication of correct decoding which is fed back to the UE from the base station back through E-HICH, or feedback information about successful reception which is replied from the base station after the base station obtains that the state transition of the UE has finished.

19. The UE according to claim 17, wherein, if the state transition triggering device triggers the state transition device to transit the UE from the CELL-PCH state to the CELL-FACH state after receiving a High Speed Shared Control Channel (HS-SCCH) scheduling instruction, or if the state transition triggering device is configured for triggering the state transition unit to transit the UE from the CELL-PCH state to the CELL-FACH state when the UE is in the CELL-PCH state and should transmit uplink data;

then the state transition notifying device transmits a state transition indication to the base station through physical channels to inform the base station that the state transition of the UE has finished, or when data are received on a HS-PDSCH resources indicated by the HS-SCCH scheduling instruction, the UE transmits the feedback information about data reception acknowledgement to the base station to inform the base station that the state transition of the UE has finished; and the indication of normal reception received by the indication reception device includes: the HS-SCCH scheduling instruction transmitted to the UE at a time N, the feedback information of successful reception replied from the base station after the base station obtains the state transition of the UE has finished, or an additional indication of normal reception, wherein N is a preset value greater than or equal to 0 microseconds.

20. The UE according to claim 17, wherein, the state transition notifying device transmits a measurement report of an RRC layer to the radio network controller so as to inform the radio network controller that the state transition has finished; and a. the indication reception device is configured for obtaining the indication of normal reception by means of the received RRC layer signaling information or RLC layer acknowledgement frames.

* * * * *

UNITED STATES PATENT AND TRADEMARK OFFICE
CERTIFICATE OF CORRECTION

PATENT NO. : 9,008,711 B2  
APPLICATION NO. : 13/120424  
DATED : April 14, 2015  
INVENTOR(S) : Xiaoka Li Page 1 of 1

It is certified that error appears in the above-identified patent and that said Letters Patent is hereby corrected as shown below:

In the Specification:
Column 2, line 9, delete "has be" and insert --has to be--;
Column 5, line 17, delete "tow" and insert --two--;
Column 6, line 62, delete "Tub" and insert --lub--;
Column 8, line 42, delete "tow" and insert --two--;
Column 9, line 20, delete """ after the word "transition";
Column 11, line 56, delete "data are received" and insert --data is received--; and
Column 12, line 67, delete ";" and insert --.--.

In the Claims:
Column 15, line 67, Claim 4, delete "LIE" and insert --UE--;
Column 16, line 23, Claim 5, delete "data are received" and insert --data is received--;
Column 18, line 1, Claim 11, delete "data are received" and insert --data is received--;
Column 18, line 48, Claim 13, delete "IS-SCCH" and insert --HS-SCCH--; and
Column 20, line 25, Claim 19, delete "data are received" and insert --data is received--.

Signed and Sealed this
Eighteenth Day of August, 2015

Michelle K. Lee
*Director of the United States Patent and Trademark Office*